Sept. 11, 1923.  1,467,890
J. B. WILKIE ET AL
MOUNTING OF ELECTRODES OR ELECTRIC DISCHARGE POINTS IN THE HULLS OF SHIPS
AND SUBMERGED STRUCTURES
Filed March 28, 1923   3 Sheets-Sheet 1
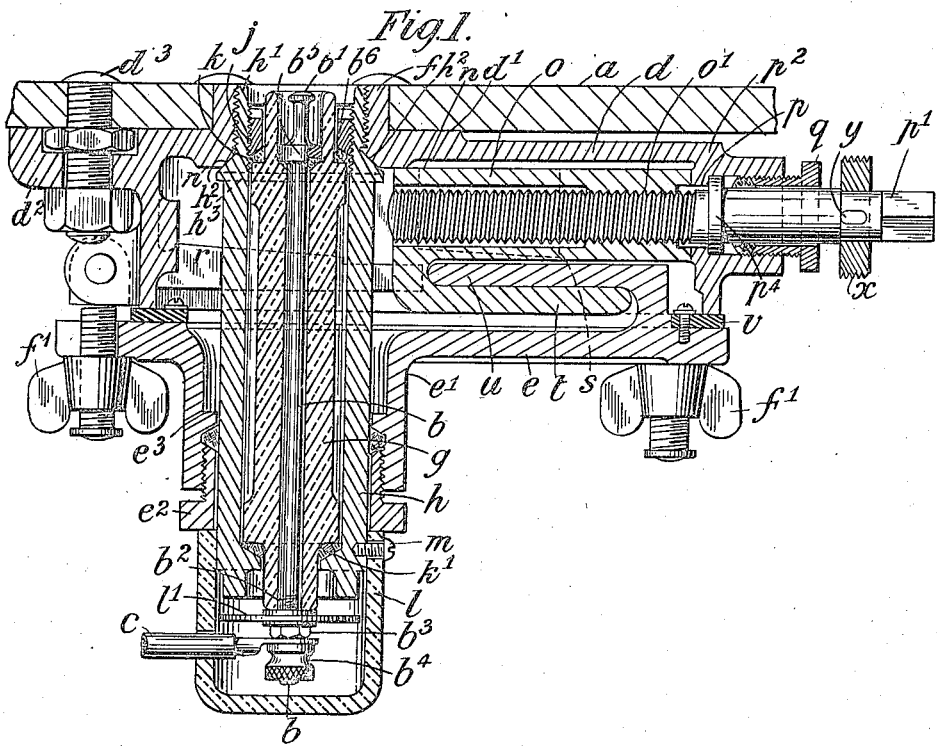
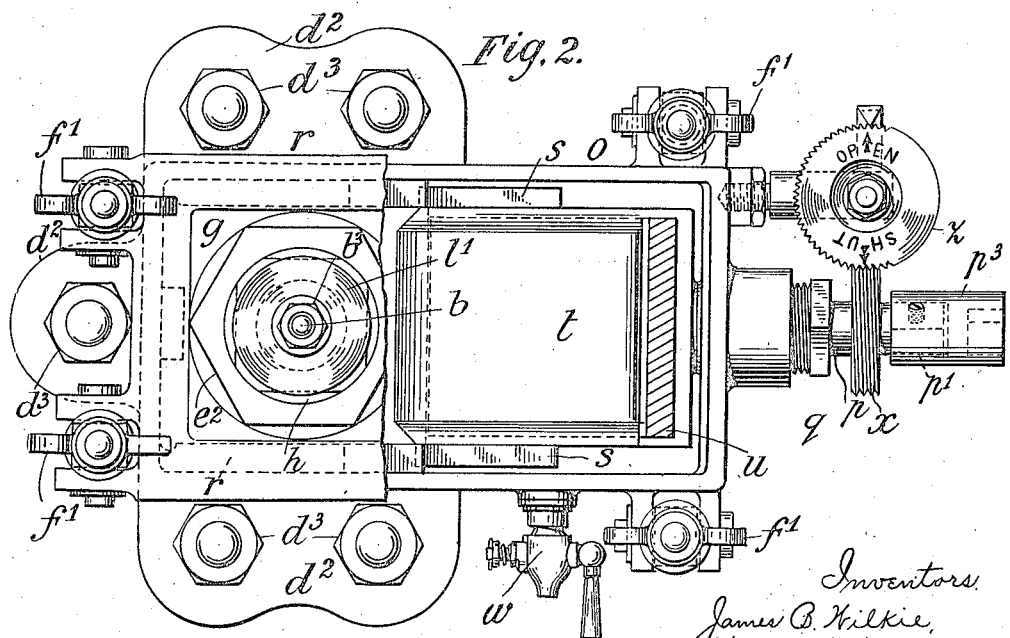

Sept. 11, 1923.  
J. B. WILKIE ET AL  
MOUNTING OF ELECTRODES OR ELECTRIC DISCHARGE POINTS IN THE HULLS OF SHIPS AND SUBMERGED STRUCTURES  
Filed March 28, 1923  
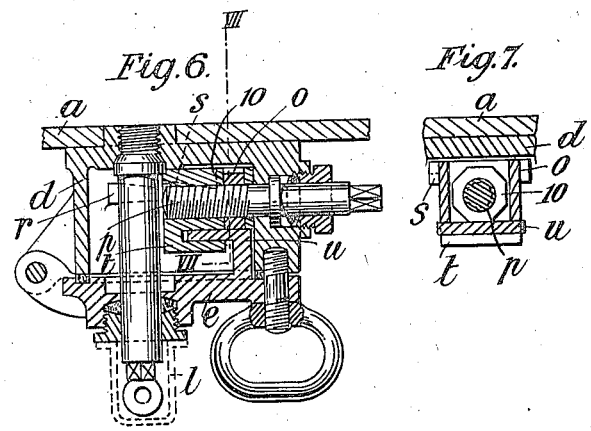
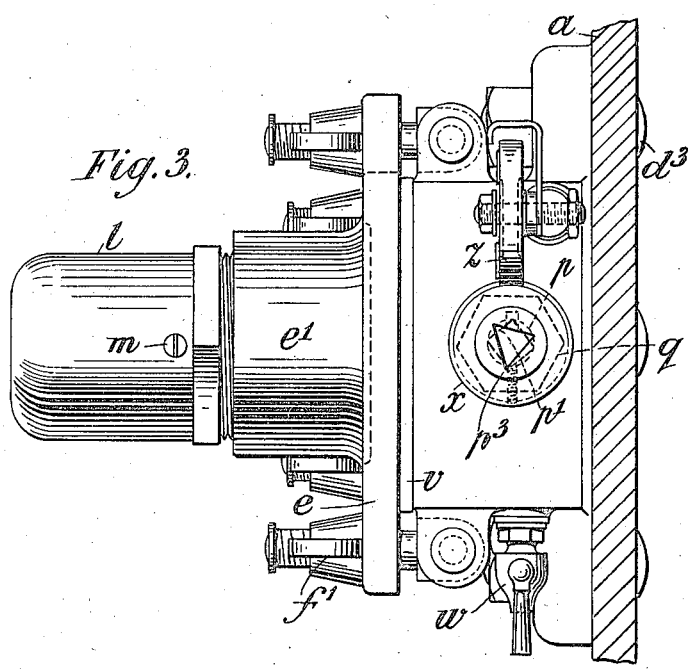
Inventors:  
James B. Wilkie  
Herbert Neville  
atty

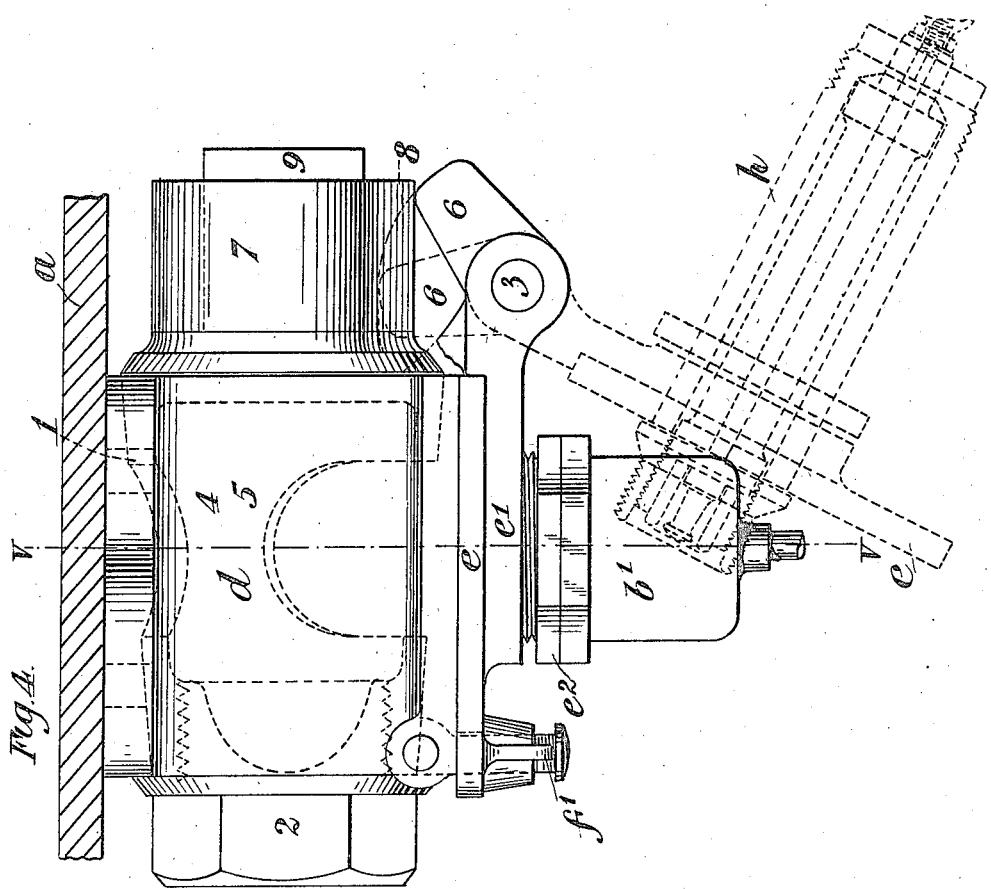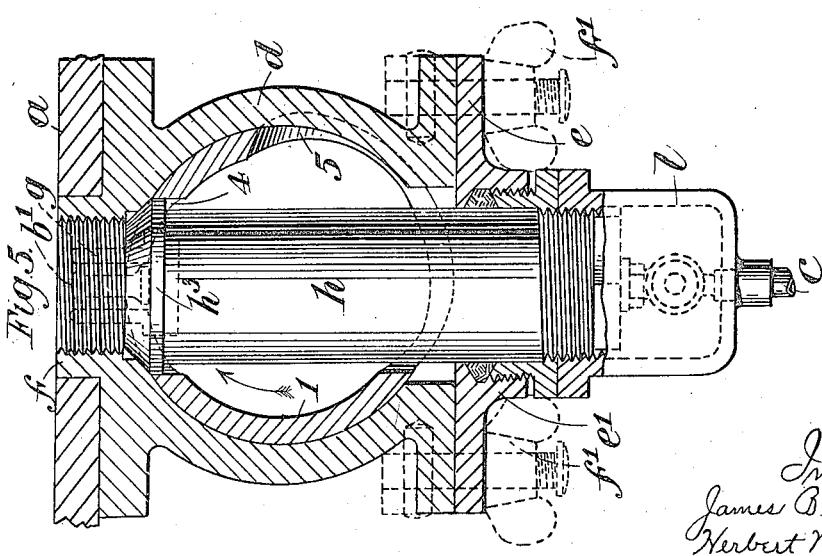

Patented Sept. 11, 1923.

1,467,890

UNITED STATES PATENT OFFICE.

JAMES BOWYER WILKIE, OF LIVERPOOL, AND HERBERT NEVILLE, OF PURLEY, ENGLAND.

MOUNTING OF ELECTRODES OR ELECTRIC DISCHARGE POINTS IN THE HULLS OF SHIPS AND SUBMERGED STRUCTURES.

Application filed March 23, 1923. Serial No. 628,313.

*To all whom it may concern:*

Be it known that we, JAMES BOWYER WILKIE, a subject of the King of Great Britain, of 29 Knowsley Road, Cressington Park, Liverpool, England, and HERBERT NEVILLE, a subject of the King of Great Britain, of "Ambleside," Downscourt Road, Purley, Surrey, England, have invented certain new and useful Improvements in and Connected with the Mounting of Electrodes or Electric Discharge Points in the Hulls of Ships and Submerged Structures, of which the following is a specification.

This invention comprises improvements in and connected with the mounting of electrodes or electric discharge points in the hulls of ships or submerged structures.

The mounting of electrodes in the hulls of ships is necessary for the carrying out of various operations, such as for example, the electrification of the hull and/or the water surrounding it for the purpose of protecting the structure and keeping it clean, the said electrification having been found to be effective for the bringing about of the muscular fixation of barnacles and the like and, in fact, for the prevention of the adherence to the hull or ship's bottom of all forms of aquatic or marine life including marine vegetation. For example, one or more electrodes or discharge points has or have been fixed in the hull and connected up with a high tension discharge, the current passing from the electrode or electrodes into the water and then into the metal of the hull or ship's bottom.

In making use of electrodes fixed in the hull and exposed to the water, it is necessary to provide means whereby it may be possible to inspect, repair or replace such electrodes from time to time. This can be done with advantage and convenience only by withdrawing such an electrode into the ship, whereupon, of course, an aperture is opened in the ship's side which must be closed until such time as the electrode is replaced.

The principal object of the present improvements is to provide means for enabling the electrode to be withdrawn without running any risk of a considerable amount of water entering the ship or structure. A further object is to devise safety and fool-proof characteristics for such means, whereby the withdrawal of an electrode shall be possible only when the safety conditions have been satisfied. Perferably, also, the means should be devised so that it is impossible for anybody to disturb the safety conditions so long as the electrode remains withdrawn.

According to this invention, the rod or the like forming the electrode is made withdrawable towards the inside of the ship or structure from the aperture which it normally occupies in the hull, bottom or submerged wall of the ship or structure, and a casing is fitted on the inner side and provided with closing means which may be closed after the withdrawal of the electrode in order to prevent water from entering the ship while the aperture remains unoccupied by the electrode. The casing may be fitted with a valvular closing means and the parts may be so adapted that it is not possible to withdraw the electrode entirely from the casing until the valvular means has been closed against the sea. Examples of valvular closing means which may be adapted for the purpose are the slide type of valve and the revoluble cock type of valve. Furthermore, the parts may be so adapted that during such time as the electrode remains withdrawn it is impossible for any careless or incompetent person to open the valvular closing means and thereby admit water to the interior of the ship or structure.

According to a simple construction, a casing is fitted on to the interior of the hull or structure (hereinafter called the hull), the said casing having an aperture coinciding with the aperture in the hull, which aperture is to be occupied by the electrode. The casing is provided with a door or cover closing an opening through which the electrode can be inserted or removed, this door being adapted for making a water-tight closure with the casing and also comprising means for the making of a water-tight connection with the electrode.

In a construction of a completely foolproof character, the casing is fitted with a valve and the valve-operating means interlock with the door or cover of the casing so that the door or cover cannot be opened until the valve has been moved to the closed position over the aperture in the hull which has been vacated by the electrode.

In order to enable the invention to be readily understood, reference is made to the accompanying drawings, which illustrate examples of suitable constructions embodying these improvements, and in which:—

Figure 1 is a horizontal section showing an electrode casing secured to the inner side of the hull and comprising a valve device of the slide type.

Figure 2 is a front elevation of the same as seen from the inner side of the hull, a portion being broken away to display the slide valve, and Figure 3 is an elevation as seen from the right hand side of Figures 1 and 2.

Figure 4 is a plan illustrating a modified construction of electrode casing comprising a valve of the revoluble plug cock type, the open condition of this casing permitting of the withdrawal of the electrode being indicated by dotted lines, and Figure 5 is a transverse section taken on the line V—V of Figure 4.

Figure 6 is a more or less diagrammatic horizontal section of a construction similar to that illustrated in Figure 1, but in this case the slide valve is fitted with a nut device which is operable only when the cover of the casing is closed, and Figure 7 is a transverse section on the line VII—VII of Figure 6.

Referring to the construction illustrated by Figures 1 to 3, $a$ is the hull or skin of the ship or submerged structure and $b$ is an electrode rod having a discharge point $b'$ at its outer end exposed to the sea and a screw threaded portion $b^2$ at its inner end for receiving a securing nut $b^3$ and a binding nut $b^4$ for electrically connecting the rod $b$ with the supply conductor $c$. This electrode rod is mounted and enclosed within a casing mounted on the inner side of the hull or skin $a$ as will now be described.

The casing $d$ is fitted with a lid or cover $e$ which may be securely attached by means of the hinged thumb nuts $f'$ as shown, or by any other suitable means. The wall of the casing $d$ opposite the cover $e$ is formed with a perforated boss $f$ which is inserted into a hole cut in the plating of the hull $a$, a suitable facing $d'$ on the outer side of the said wall fitting against the inner side of the said plating as seen in Figure 1. The casing is formed with suitable lugs $d^2$ for enabling it to be bolted or riveted at $d^3$ to the plating of the hull $a$.

The electrode rod $b$ is secured within a porcelain or other insulating sleeve $g$ which, in turn, is secured within a metal sleeve $h$, the latter having a reduced screw-threaded end portion $h'$ for screwing into the screw-threaded perforation in the boss $f$. The electrode rod $b$ has a collar $b^5$ at the root of its discharge point which, upon insertion of the rod and the tightening of the nut $b^3$, is drawn against rubber or other packing $b^6$. The porcelain sleeve $g$ is secured within the metal sleeve $h$ by a gland nut $j$ which compresses packing $k$ against a shoulder on the porcelain sleeve $g$, the inner end of the latter being reduced so as to pass through a hole in the inner end of the sleeve $h$ and the shoulder thereby formed being pressed against packing $k'$ by the tightening of the gland nut $j$. At the root of its screw-threaded portion $h'$ the sleeve $h$ is formed with a conical face or shoulder $h^2$ for engaging against a conical seating formed at the inner end of the perforated boss $f$ when the metal sleeve $h$ is screwed home in the said boss $f$, as is seen clearly in Figure 1. The inner end portion of the metal sleeve $h$ passes through a stuffing box $e'$ formed on the lid or cover $e$, the tightening up of a gland nut $e^2$ serving to effect a water-tight joint between the lid $e$ and the sleeve $h$. It will be noted that the collar $h^3$ formed by the conical shoulder $h^2$ will engage with the flange $e^3$ within the stuffing box $e'$ in the event of any attempt being made to withdraw the metal sleeve $h$ with its contained insulator $g$ and electrode rod $b$ while the lid or cover $e$ remains fixed upon the casing $d$. An insulating cap $l$ may be secured, as by a set screw $m$, to the end of the sleeve $h$ projecting through the gland nut $e^2$ in order to prevent any person from receiving a shock from the terminal of the electrode rod.

Within the casing $d$ and around the conical seating at the inner end of the perforation of the boss $f$, there is formed a seating $n$ for a slide valve $o$. The latter is formed with a nut portion $o'$ in which works a feed screw $p$ which can be operated by a suitable key applied to its shaped end $p'$. The side wall of the casing $d$ is formed with a stuffing box $p^2$ in which is screwed a gland $q$ for tightening packing on to the shank of the feed screw $p$ and making a water-tight joint therewith. Moreover, the said shank is formed with a collar $p^4$ which is situated in the stuffing box and prevents endwise movement of the feed screw $p$. In Figure 1, the slide valve $o$ is shown in the withdrawn position and it is apparent that it cannot be closed by the feed screw $p$ until the casing $h$ has been withdrawn from the perforated boss $f$. Within the casing $d$ wedge surfaces $r$ are so disposed as to engage with wedge devices $s$ (seen in dotted lines) on the valve $o$ when the latter approaches or reaches its closed position, so as to effect a tight engagement of the valve with its seat $n$.

The valve $o$ is formed with a hook member $t$ and the inner side of the lid or cover $e$ is formed with a similar hook member $u$. In the withdrawn condition of the valve $o$ these two hook portions engage with one another as will be apparent from Figure 1, but when the valve $o$ is moved to the closed position, the hook portion $t$ disengages from the hook portion $u$. A suitable packing strip $v$ is inserted between the lid $e$ and its seating on the casing $d$.

In Figure 1 it will be noted that an insulation disc or screen $l'$ is mounted on the electrode rod $b$ in order to prevent sparking or arcing from the terminal portion of the rod to the adjacent end of the metal sleeve $h$. In Figure 2, parts are removed so that it may be seen that the inner end of the metal sleeve $h$ is formed square with rounded corners, the square shape enabling it to be readily turned by the aid of a key or spanner. Also, in Figure 2, a portion of the cover has been removed and the hook portion $u$ has been broken away, thereby displaying the valve and certain associate parts. Lastly, in Figure 2, a sleeve $p^3$ with a key socket is shown secured on the shaped end $p'$ of the feed screw shank.

Normally, the parts occupy the position seen in Figure 1, in which the discharge point $b'$ of the electrode rod $b$ is exposed to the sea for electrifying the water surrounding the ship in the well-known manner and for the purpose above described the current returning through the hull of the ship. The various water-tight joints above described prevent water from leaking into the casing $d$ from the sea or from the casing into the ship. In this condition of the parts, the valve $o$ cannot be moved to the closed position as the electrode device is in the way. Also, the lid $e$ of the casing $d$ cannot be opened owing to the engagement of the hook portions $t$ and $u$. If it be desired to inspect, repair or replace the electrode device, the outer sleeve $h$ of the latter is unscrewed from the perforated boss $f$ and is withdrawn through the stuffing box and gland $e'$ $e^2$ until the shoulder or collar $h^3$ comes against the flange $e^3$ of the stuffing box of the lid to prevent further and complete withdrawal of the electrode device. The feed screw $p$ is now revolved by the aid of a suitable key applied to the shaped end $p'$ in the direction for causing the valve $o$ to be moved to the closed position on the seating $n$, the wedge devices $r$ and $s$ co-operating to effect a tight closure of the valve $o$. When the valve $o$ completes its closing movement, the hook device $t$ on the valve disengages entirely from the hook device $u$ on the lid $e$ whereby the latter may now be freely opened without fear of admission of water to the interior of the ship. The electrode device is removable by withdrawing it from the inner side of the opened lid $e$ and, when withdrawn, is readily inspected or repaired. When it is desired to close the casing, the electrode device is replaced with its outer end portion in the stuffing box $e'$ of the lid $e$ and the latter is closed and fastened. The feed screw $p$ is then revolved in the direction for moving the valve $o$ to the open position the hook devices $t$, $u$ thereupon re-engaging as will be readily understood. The metal sleeve $h$ of the electrode device is now screwed home into the perforated boss $f$ so as to seat the conical shoulder $h^2$ and restore the parts to the position seen in Figure 1.

As shown in Figures 2 and 3, there may be a test cock or drain tap $w$ on the casing $d$ so that it may be possible to ascertain whether or not there is any leak past the electrode device into the casing $d$ and also to permit of the running off of water in the casing $d$ after the electrode device has been screwed home. Also, a worm $x$ may be fixed on the shank of the feed screw (the seating $y$ for this worm being seen in Figure 1) and may drive a worm wheel $z$ bearing suitable indications for indicating whether the valve is open or shut.

According to the modified construction illustrated in Figures 4 and 5, the casing $d$ is formed as the casing of a revoluble conical plug cock, the plug 1 being secured in its seating in the casing by means of the large screw stud 2, in the well-known manner. This casing, like the casing in Figures 1 to 3, is formed with a perforated boss $f$ which is inserted into a hole in the hull plaiting $a$, the perforation in the boss being screw-threaded for the reception of the screw-threaded portion of the electrode device comprising the outer metal sleeve $h$, the intermediate porcelain sleeve $g$ and the central electrode rod having a discharge point $b'$, all these parts having been fully described with reference to Figures 1 to 3. The lid $e$ of the casing in this construction has a stuffing box $e'$ and gland $e^2$ for taking a tight joint with the metal sleeve $h$ and is secured at one side by thumb nuts $f'$ but is hingedly attached at 3 to the casing $d$ at the opposite side. It will be seen that the plug 1 is hollow and formed with two ports, one of these marked 4 being very little larger than the collar $h^3$ of the sleeve $h$ and the other marked 5 extending around a much larger arc than the port 4. As in the construction Figures 1 to 3, the collar $h^3$ is adapted for coming into engagement with the lid $e$ to prevent complete withdrawal of the electrode device until the lid is removed, after due closure of the cock has been effected.

In use, the electrode device extends through the stuffing box $e'$ and gland $e^2$ in the lid $e$, through one end portion of the long port 5 in the plug 1 of the cock, through the small port 4, and into the screw-threaded aperture in the boss $f$. In this condition of the parts, as will be apparent from Figure 5, the plug 1 of the cock cannot be turned owing to the collar $h^3$ of the electrode device occupying the short port 4. When it is desired to inspect the electrode, the sleeve $h$ is unscrewed out of the boss $f$ and the electrode device is withdrawn until the screw-threaded end of the sleeve $h$ is clearly within the plug 1 and no longer obstructing the port 4, or until the collar $h^3$ is arrested by coming into contact with the inner side of the lid $e$. The cock plug 1 is now free to be turned in the direction of the arrow in Figure 5, to the extent permitted by the magnitude of the arc of the long port 5, in which latter, of course, the electrode device is still situated. This turning of the plug 1 is sufficient for closing the aperture in the boss $f$ and shutting out of the sea water, and the lid $e$ of the casing $d$ may then be opened for inspection or removal of the electrode device. The lid $e$ is shown in the open position in dotted lines in Figure 4, and from this illustration it will be seen that the electrode device is readily withdrawable from the inner side of the lid.

In order to prevent the lid or cover $e$ from being opened, excepting when the cock plug 1 is in the position for closing the aperture in the boss $f$, the handle, wheel or other means for operating the cock plug may be adapted for obstructing the lid excepting in that position which is occupied by such means in the closed condition of the plug 1. For example, and as illustrated in Figure 4, the hinged lid $e$ may have a tail piece or arm 6 normally bearing against the periphery of a wheel, disc or sleeve 7 fixed on the spindle of the cock plug so that the lid $e$ cannot be opened when the plug 1 is in the open position owing to the tail or arm 6 bearing against the said periphery. The latter, however, may be formed with a recess at one point in its periphery and this recess, indicated by chain-line at 8 in Figure 4, is so disposed as to come opposite to the tail or arm 6 when the plug 1 is turned to the closed position. The lid $e$ may then be opened, as the tail or arm will enter into such recess, as indicated by the dotted lines, in the act of opening the lid. This same means will operate to prevent opening of the cock plug until such time as the lid $e$ has been closed and the arm 6 disengaged from the recess 8. Suitable stops may be provided for limiting the turning movements of the plug 1, and indicator devices may be fitted for facilitating manipulation of the parts. As shown in Figure 4, the plug 1 may be formed with a stub spindle 9 with which a key device may be engaged. For instance, the spindle 9 may be formed with an angular socket for the insertion of a key device for turning the plug.

In any construction, locking devices may be provided for the lids or covers which can only be unlocked by the aid of an appropriate key in the charge of some responsible person.

In Figures 4 and 5, the insulation cap $l$ is seen to be screwed on to a screw-threaded inner portion of the sleeve $h$ and the conductor $c$ is shown passing through a central aperture in the end of the cap $l$. However, the arrangement of cap and conductor described with reference to Figures 1 to 3 may be employed if desired.

The construction illustrated in Figures 6 and 7 is substantially similar to that illustrated in Figures 1 to 3, the principal difference consisting in forming a slot or hole in the valve $o$ and inserting therein a feed nut 10, instead of the valve itself being formed with a feed nut portion. It will be noticed that the nut 10 is so shaped and dimensioned that it is engaged and prevented from revolving by the inner face of the hook portion $u$ of the lid or cover $e$. Consequently, so long as the lid $e$ remains closed, the feed screw is operable for shifting the valve $o$. If the valve $o$ be closed and the lid $e$ be opened, however, the hook portion $u$ is disengaged from the nut 10 so that any turning of the feed screw $p$ will then fail to shift the valve seeing that there is nothing to resist the turning of the nut 10 with the screw. In this way, the device is rendered completely fool-proof, seeing that it is impossible for any person to open the valve $o$ whilst the lid $e$ remains in the open condition. In Figure 6 the lid $e$ is shown to be hingedly attached to the casing $d$, as in the case of the construction seen in Figures 4 and 5, and is not completely removable as in the construction described with reference to Figures 1 to 3.

The electrodes hereinbefore described may have brass points or heads for exposure to the sea water and the conductor rods may be grooved at intervals for the purpose of giving the insulation sleeves a good hold upon them. The metal sleeves enclosing the insulation sleeves may be of brass or gun metal and their interiors may be grooved at intervals in order that the exteriors of the insulation sleeves may have a proper hold in the metal sleeves.

In the constructions hereinbefore described with reference to Figures 1 to 5, the discharge points of the electrode rods are within sockets formed in the insulation sleeves and do not project beyond the surface of the hull. In the event of a discharge point being required to project beyond the surface of the hull, a protective ring may be fixed outside of the hull and around the orifice of the perforated boss and the thickness of the ring would be greater than the extent to which the electrode projects from the hull, as will be readily understood.

In the drawings, the casings are shown fixed against the hull plates of the vessel. When desirable, so-called pad plates may be riveted to the inner faces of the hull plates and the casings may be bolted to such pad plates instead of being secured directly to the hull plates.

In some circumstances, the head of water due to the depth at which the electrode device is situated, may create such a pressure on the electrode device that the latter, upon being unscrewed, may be driven back or inwards with a certain amount of impact against the lid or cover of the casing. This might occur, for example, supposing the tightness of the stuffing box had not been maintained. No difficulty arises in this connection, however, for a buffer or anti-concussion spring could be arranged around the electrode device so that it would be compressed between the lid and the collar of the electrode device, whenever the latter is forced inwards.

We claim:—

1. Electrode casing applicable to the interior of the wall of a submerged structure, the said casing comprising means for mounting the electrode device in an aperture in said casing, and closing means operative for closing said aperture when the latter is vacated by the withdrawal therefrom of the electrode, substantially as set forth.

2. Electrode casing adapted for being fitted from the interior into an opening in the wall of a submerged structure, the said casing comprising means for mounting the electrode device in an aperture in said casing coinciding with the opening in said wall, a removable cover for said casing said cover having an aperture for the passage of the inner end of said electrode device and a valve mounted within said casing and adapted for closing said aperture therein when the electrode device is withdrawn therefrom, substantially as set forth.

3. Electrode casing adapted for being fitted from the interior into an opening in the wall of submerged structure, the said casing comprising means for mounting the electrode device in an aperture in said casing coinciding with the opening in said wall, a removable cover for said casing, said cover having an aperture for the passage of the inner end of said electrode device, packing means on said cover for making a fluid-tight joint between said cover and said electrode device, and a valve mounted within said casing and adapted for closing said aperture therein when the electrode device is withdrawn therefrom, substantially as set forth.

4. An electrode casing and electrode device applicable to an inner surface of a submerged structure for the purpose set forth, said casing comprising means for mounting the electrode device in an aperture in one of its walls, a cover forming a wall opposite the apertured wall, said cover having an aperture for the passage of the inner end of said electrode device, stop means on said electrode device adapted for engaging said cover when said electrode device is partially withdrawn and a valve mounted within said casing and adapted for closing said aperture therein.

5. An electrode casing and electrode device applicable to an inner surface of a submerged structure for the purpose set forth, said casing comprising means for mounting the electrode device in an aperture in one of its walls, a cover forming a wall opposite the apertured wall, said cover having an aperture for the passage of the inner end of said electrode device, stop means on said electrode device adapted for engaging said cover when said electrode device is partially withdrawn, adjustable packing means adapted for effecting a fluid-tight joint between said electrode device and said cover, and a valve mounted within said casing and adapted for closing said aperture therein.

6. In an electrode casing for submerged structures, the combination of a valve adjustable to and from a position in which it closes an electrode aperture in said casing, a cover, means for mounting an electrode device in the aperture in said casing, and interlocking means operative between said cover and said valve when the latter is in an open condition, whereby said cover is locked in the closed position until released by the closing of said valve.

7. An electrode device for submerged structures, comprising a rod electrode, a cylindrical metal shell adapted for the reception and insulation of said rod, a casing formed with an aperture in one of its walls, means for mounting said shell in said aperture, a removable perforated cover for said casing the inner end of said shell passing through the perforation of the cover when the latter is mounted on the casing, stop means adapted for preventing complete withdrawal of said shell through the perforation in said cover so long as said cover remains fixed, and a valve within said casing adjustable for closing said aperture when said shell is withdrawn therefrom, substantially as set forth.

8. In an electrode casing for submerged structures, the combination of a valve and its operating means, said valve being operative for closing an electrode aperture in said casing, a cover for said casing, means for mounting an electrode device in the aperture in said casing, interlocking means operative between said cover and said valve when the latter is in an open condition, whereby said cover is locked in a closed position until released by the closing of said valve, said interlocking means being also adapted for preventing opening of said valve in the open condition of said cover, substantially as set forth.

9. An electrode device for submerged structures comprising a rod electrode, an insulation sleeve, securing means adapted for securing said electrode in a fluid-tight manner in the bore of said sleeve, a cylindrical sheet metal shell, securing means adapted for securing said insulation sleeve in a fluid-tight manner in said shell, a casing formed in one of its walls with a screw-threaded aperture and a seating, screw-threads on one end portion of said shell adapted for screwing into said aperture, an annular projection on said shell adapted for fluid-tightly engaging with said seating said projection also presenting a stop shoulder, a valve mounted in said casing and adapted for closing said aperture when the electrode device is withdrawn therefrom, a fluid-tight cover for said casing, fastenings for said cover, a stuffing box on said cover adapted for fluid-tight sliding engagement with the body of said shell and for acting as an abutment for said stop shoulder when said electrode device is withdrawn from said aperture, and interlocking means operative between said valve and cover for preventing opening of said cover in an open condition of said valve and for releasing said cover upon closure of said valve, substantially as set forth.

JAMES BOWYER WILKIE.
HERBERT NEVILLE.